US006385184B2

(12) United States Patent
Kitade et al.

(10) Patent No.: US 6,385,184 B2
(45) Date of Patent: May 7, 2002

(54) BASE STATION APPARATUS AND TRANSMISSION POWER CONTROL METHOD

(75) Inventors: Takashi Kitade, Yokosuka; Kazuyuki Miya, Kawasaki; Masaki Hayashi, Yokosuka, all of (JP)

(73) Assignee: Matsushita Electric Industrial Co., Ltd., Osaka (JP)

(*) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/306,397

(22) Filed: May 6, 1999

(30) Foreign Application Priority Data

May 8, 1998 (JP) .......................................... 10-126225

(51) Int. Cl.⁷ ........................ H04B 7/185; H04B 7/212; H04J 3/06
(52) U.S. Cl. ........................ 370/337; 370/318; 370/377; 370/350
(58) Field of Search ................................. 370/335, 342, 370/343, 328, 329, 332, 336, 318, 347, 350, 321, 337, 442; 455/69

(56) References Cited

U.S. PATENT DOCUMENTS

| 5,566,165 A | * | 10/1996 | Sawahashi ................... 370/342 |
| 5,590,409 A | * | 12/1996 | Sawahashi et al. ......... 370/342 |
| 5,604,730 A | | 2/1997 | Tiedeman, Jr. |
| 5,621,723 A | | 4/1997 | Walton, Jr. et al. |
| 5,737,327 A | | 4/1998 | Ling et al. |
| 5,815,798 A | | 9/1998 | Bhaglia et al. |
| 5,839,056 A | * | 11/1998 | Hakkinen ..................... 455/69 |
| 6,034,952 A | * | 3/2000 | Dohi et al. ................. 370/335 |
| 6,097,711 A | | 8/2000 | Okawa et al. |
| 6,166,622 A | | 12/2000 | Hosur et al. |

FOREIGN PATENT DOCUMENTS

| EP | 0810743 | 12/1997 |
| JP | 09321699 | 12/1997 |
| JP | 10051354 | 2/1998 |
| WO | 9734387 | 9/1997 |

OTHER PUBLICATIONS

European Search Report dated Nov. 21, 2001, (EP 99 10 8976) & (EP 01 10 9058).
European Search Report dated Nov. 23, 2001, (EP 01 10 9056) & (EP 01 10 9055).
"Effects of SIR–based Transmit Power Control for Coherent DS–CDMA Mobile Communication", by Shunsuke SEO et al., Techinal Report of IEICE, pp. 43–48, Feb. 1997, with an English language Abstract.

\* cited by examiner

Primary Examiner—Hassan Kizou
Assistant Examiner—Hanh Nguyen
(74) Attorney, Agent, or Firm—Stevens, Davis, Miller & Mosher, LLP (57) ABSTRACT

The base station apparatus according to the present invention places pilot data and transmission power control data independently of each other in a slot based on processing delays and propagation delays required for transmission power control and places slots by providing an offset for the slot locational relationship between the uplink and downlink.

15 Claims, 10 Drawing Sheets

BASE STATION APPARATUS AND TRANSMISSION POWER CONTROL METHOD

BACKGROUND OF THE INVENTION

1. Field of the Invention

The present invention relates to base station aparatuses carrying out transmission power control in CDMA communications and their transmission power control methods.

2. Description of the Related Art

A CDMA (Code Division Multiple Access) system is one of the multiple access system technologies used in radio communication systems using mobile telephones and portable telephones, etc. when a plurality of stations carry out communications simultaneously on a same frequency band.

The CDMA system implements multiple accesses by spread spectrum communications in which information signals are transmitted with their spectrum spread over a sufficiently wide band relative to the original information bandwidth. In the CDMA system, there are several ways to implement the spread spectrum system above. Among them, a direct sequence system is a system in which a spreading code which has a faster transmission rate than the transmission rate of an information signal is directly carried on the information signal at the time of spreading. In this case, signals from a plurality of mobile stations are multiplexed on a same frequency area and same time zone.

The CDMA system using direct sequence has a so-called "near-far" problem. This "near-far" problem occurs when a desired transmitting station is located far and another undesired transmitting station (interfering station) is near, which causes the reception power of a received signal from the interfering station to be greater than that from the desired transmitting station, preventing the stations using only processing gain (spreading gain) from suppressing correlation between spreading codes, which disables communications. For a cellular system using the direct sequence CDMA system, it is therefore indispensable to control transmission power according to the state of each channel condition on the uplink from a mobile station to a base station.

Furthermore, as a countermeasure for fading which is the cause of degradation of the BER(Bit Error Rate) in terrestrial mobile communications, a method for compensating variations of instantaneous values of reception power by controlling transmission power is proposed.

Figure 1:
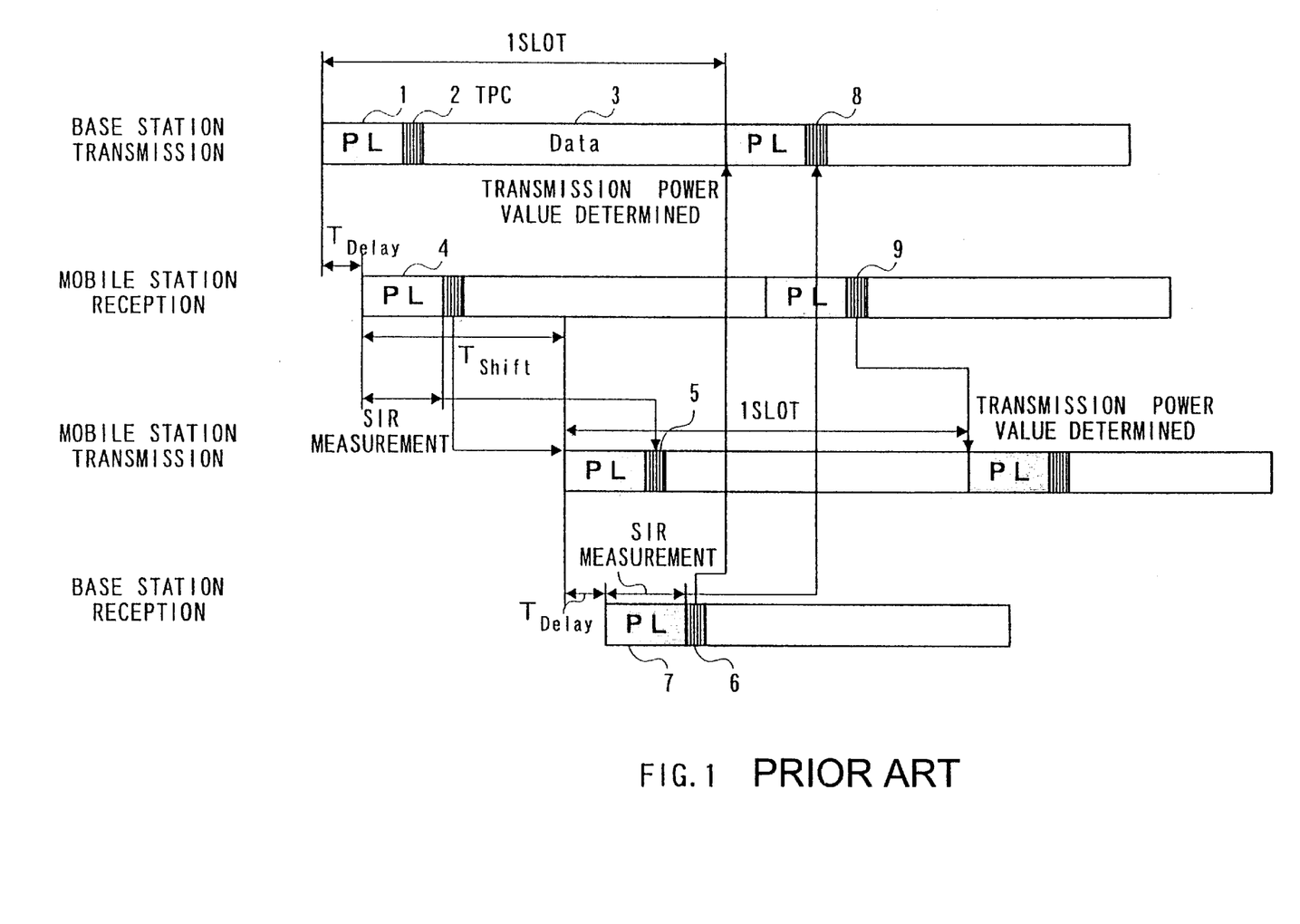
FIG. 1 is a slot configuration diagram of a signal transmitted/received at a high transmission rate in a conventional radio communication system.

The operation of closed-loop transmission power control processing is explained using a conventional slot configuration. FIG. 1 shows a slot configuration on a time scale when carrying out conventional transmission power control.

Signals consisting of pilot data 1, transmission power control data (TPC) 2 and transmission data 3 which are time-multiplexed in slot units are transmitted from a base station. Pilot data 1 is a signal with a fixed information pattern and is used by a mobile station to estimate channel conditions for demodulation and measure SIR (signal to interference ratio) and transmission power control data 2 is used as a transmission power control command.

Signals on the uplink from a mobile station to a base station as well as signals on the downlink from a base station to a mobile station are transmitted as slot cycle signals and a ½ slot timing offset (TShift) is added to the downlink to minimize a transmission power control delay.

First, transmission power control performed on the downlink is explained. A signal sent from a base station is received by a mobile station with a propagation delay of TDelay (corresponding to the distance from the base station to the mobile station). The mobile station measures reception SIR according to pilot data 4 at the start of a slot. Then, the mobile station compares this SIR measurement result with a given reference SIR and if the reception SIR is lower, generates a transmission power control bit which instructs the base station to increase transmission power, and if the reception SIR is higher, generates a transmission power control bit as a command to instruct the base station to lower transmission power. This transmission power control bit is embedded as transmission power control data 5 on the uplink and transmitted.

A signal sent from the mobile station is received by the base station with a delay of TDelay. The base station detects transmission power control data 6 and determines the transmission power value on the downlink from the result and reflects it in the transmission power at the start of the next downlink slot.

Then, the operation of transmission power control performed on the uplink is explained.

A signal sent from the mobile station is received by the base station with a delay of TDelay. The base station measures SIR according to pilot data 7 at the start of a slot and compares the reception SIR and a reference SIR as in the case of the mobile station, generates a transmission power control bit which is a command to instruct whether to increase/decrease transmission power and embeds it in transmission power control data 8 on the downlink and transmits it.

A signal sent from the base station is received by the mobile station with a delay of TDelay. The mobile station detects transmission power control data 9 and determines the transmission power value on the uplink from the result and reflects it in the transmission power at the start of the next uplink slot.

Since the uplink slot has a timing offset of ½ slot with respect to the downlink slot, transmission power control is carried out with one time slot control delay (the result of control 1 slot before is reflected) for both the downlink and uplink.

Figure 2:
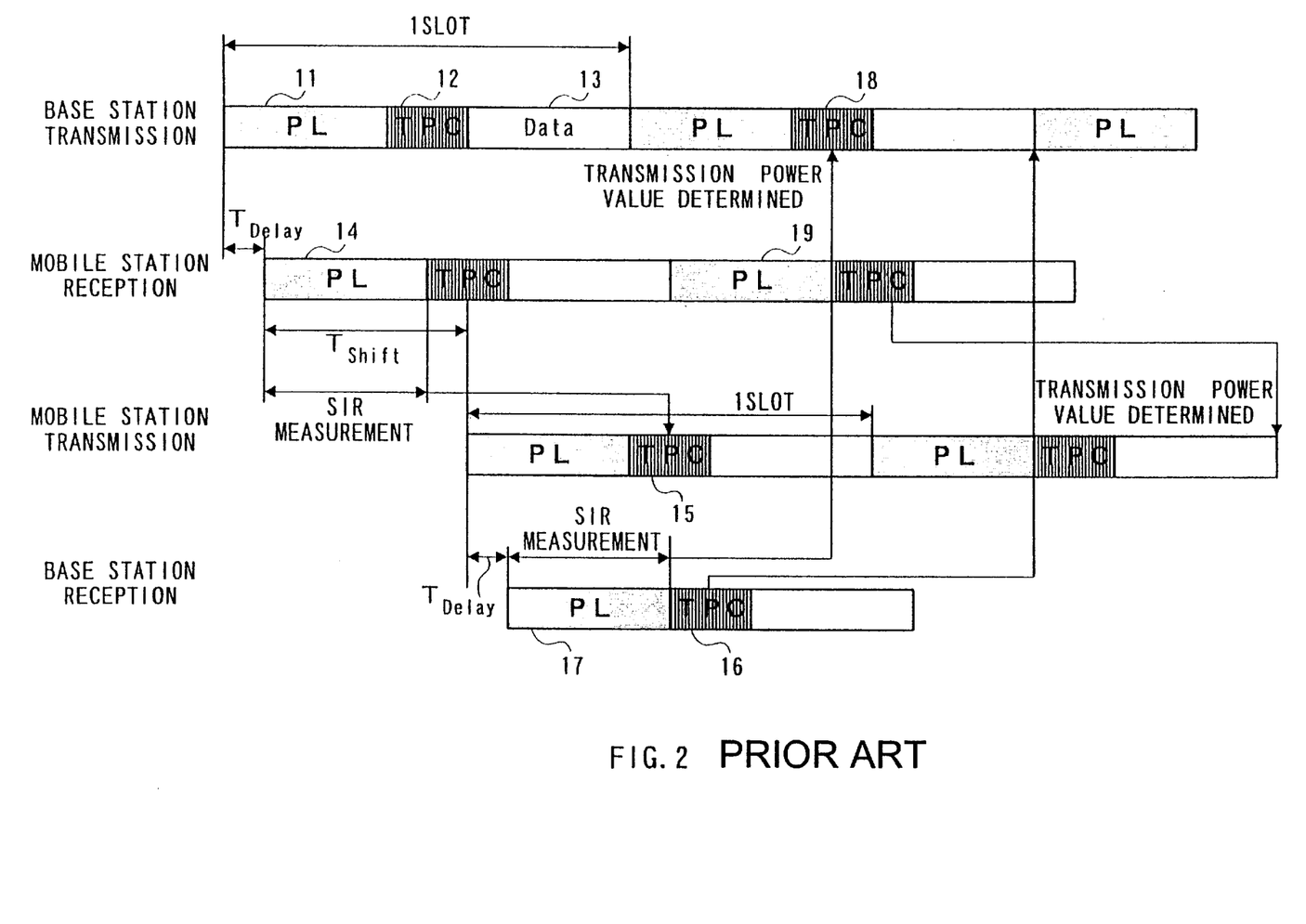
FIG. 2 is a slot configuration diagram of a signal transmitted/received at a low transmission rate in the conventional radio communication system.

Then, a case where the transmission rate is lowered is explained with reference to FIG. 2. When the transmission rate is lowered, the absolute time of 1 bit (or symbol) becomes longer, which increases the ratios of pilot data length and transmission power control bit length to the slot length.

In this case, as the case above, signals 11 to 13 sent from the base station are received by the mobile station with a propagation delay of TDelay (corresponding to the distance from the base station to the mobile station) and the mobile station measures the reception SIR from pilot data 14 at the start of a slot. The mobile station compares this SIR measurement result with a reference SIR and embeds the result as transmission power control data 15 on the uplink and transmits it.

A signal sent from the mobile station is received by the base station with a delay of TDelay. The base station detects transmission power control data 16 and determines the transmission power value of the downlink from the result and reflects it in the transmission power at the start of the next downlink slot.

A signal sent from the mobile station on the uplink is received by the base station with a delay of TDelay. The base station measures SIR according to pilot data 17 at the start of a slot and compares the reception SIR with a reference SIR as in the case of the mobile station, generates a transmission power control bit which is a command to instruct whether to increase/decrease transmission power and embeds it in transmission power control data 18 on the downlink and transmits it.

A signal sent from the base station is received by the mobile station with a delay of TDelay. The mobile station detects transmission power control data 19 and determines the transmission power value on the uplink from the result and reflects it in the transmission power at the start of the next downlink slot.

With low rate transmissions in the conventional apparatus, however, the ratios of the pilot data length and transmission power control bit length to the slot length may increase, causing a transmission power control delay due to a closed loop to increase. When a transmission power control delay increases, transmission power control is not reflected in the next slot, disabling appropriate transmission power control according to changes in a communication environment.

It also has a problem that minimizing a control delay would lead to a reduction of the SIR measurement time used for transmission power control, making it impossible to achieve the sufficient measurement accuracy.

SUMMARY OF THE INVENTION

It is an objective of the present invention to provide a base station apparatus and transmission power control method capable of minimizing control delays in closed-loop transmission power control and suppressing deterioration of the measuring accuracy due to reduced SIR measurement time.

The inventor came to come up with the present invention by discovering by focusing on a data slot configuration that adequately changing the arrangement of a slot configuration could prevent transmission power control from failing to catch the next slot when pilot data and transmission power control data are relatively long.

In this case, the arrangement of the slot configuration is performed by taking into account a propagation delay from a base station to a mobile station, the pilot data length for measuring the quality of the received signal, and time factors that could possibly cause control delays including the processing time after the mobile station has received the last part of the pilot data until it measures the quality of the received signal and embeds transmission power control data, a propagation delay from the mobile station to the base station, and the processing time after the base station has received the transmission power control data until it detects the transmission power control data and changes the power, etc.

BRIEF DESCRIPTION OF THE DRAWINGS

The above and other objects and features of the invention will appear more fully hereinafter from a consideration of the following description taken in connection with the accompanying drawing wherein one example is illustrated by way of example, in which.

DETAILED DESCRIPTION OF THE PREFERRED EMBODIMENTS

With reference now to the attached drawings, the embodiments of the present invention are explained in detail below.
(Embodiment 1)

Figure 3:
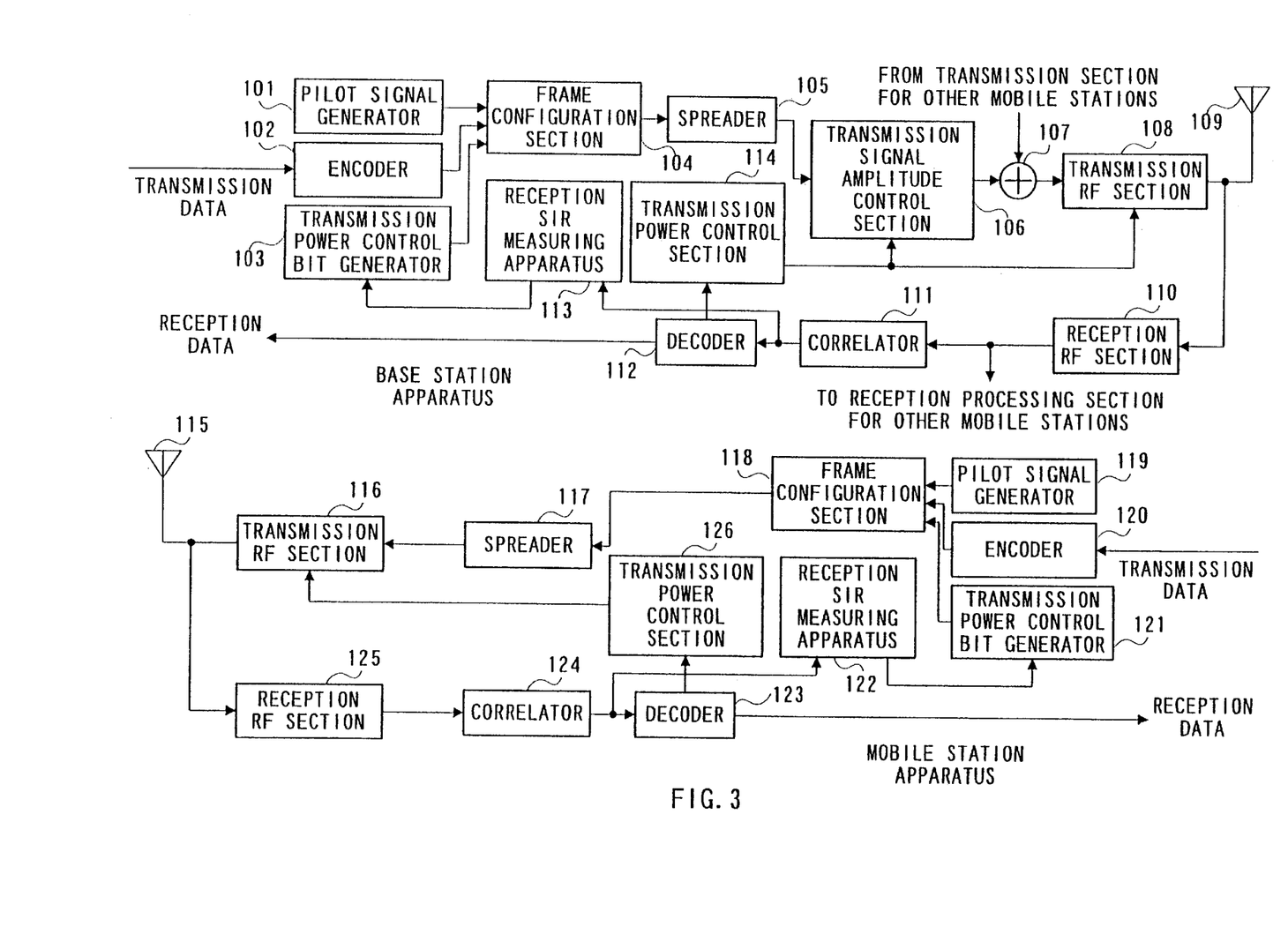
FIG. 3 is a block diagram showing the configuration of a radio communication system according to embodiments of the present invention.

FIG. 3 is a block diagram showing the configuration of a radio communication system according to Embodiment 1 of the present invention. This radio communication system comprises a base station apparatus and mobile station apparatus.

In the base station apparatus, transmission data to the mobile station are input to encoder 102 for forward error correction(FEC) and encoding. The encoded data is input to frame configuration section 104. Pilot signal generator 101 generates pilot signals with fixed data patterns and outputs them to frame configuration section 104.

Frame configuration section 104 arranges the output data of encoder 102, a pilot signal from pilot signal generator 101 and a transmission power control bit which is the output of transmission power control bit generator 103 to the determined position, and outputs it to spreader 105. This arrangement is determined by taking into account processing delays and propagation delays required for transmission power control. Furthermore, frame configuration section 104 provides a slot offset, that is, it shifts slots by a given time.

Spreader 105 carries out spreading processing and outputs the spread signal to transmission signal amplitude control section 106. Transmission signal amplitude control section 106 controls the amplitude of the input signal and outputs the signal to adder 107. Adder 107 adds up the output of transmission signal amplitude control section 106 and signals from the transmission section for other mobile stations and outputs the result to transmission RF section 108. Transmission RF section 108 carries out modulation and frequency conversion on the input and transmits the signal from antenna 109.

A signal of the mobile station received through antenna 109 is subjected to frequency conversion and demodulation in reception RF section and output to correlator 111 and the reception processing section for other mobile stations. Correlator 111 despreads the signal using the spreading code used for mobile station transmission, separates a desired wave signal and outputs it to decoder 112 and reception SIR measuring apparatus 113. Decoder 112 decodes the input and obtains received data. Reception SIR measuring apparatus 113 measures reception SIR from the received signal and outputs the result to transmission power control bit generator 103.

Transmission power control bit generator 103 compares the input reception SIR with a reference SIR and generates transmission power control data. The transmission power control data detected by decoder 112 are output to transmission power control section 114 where the transmission power value is determined. This transmission power value is sent to transmission signal amplitude control section 106 and transmission RF section 108 and the transmission power is controlled according to this transmission power value.

The mobile station apparatus has the same structure as that of the base station apparatus except sections for multiplexing and distributing signals from other mobile stations and transmission signal amplitude control section 106 that controls the amplitude of a transmission signal by multiplexing. That is, pilot signal generator 101 to spreader 105 and adder 107 to antenna 109 correspond to antenna 115 to transmission power control section 126, respectively and these sections operate identically.

Then, an example of slot configuration used for low rate transmission performed in the radio communication system configured as shown above is explained with reference to FIG. 4. The slot configuration for the downlink is the same as the conventional one. With respect to the slot configuration for the uplink, it is different from the conventional one in that pilot data are separated from transmission power control data in the slot, and is different in the offset between the uplink and the downlink.

Figure 4:
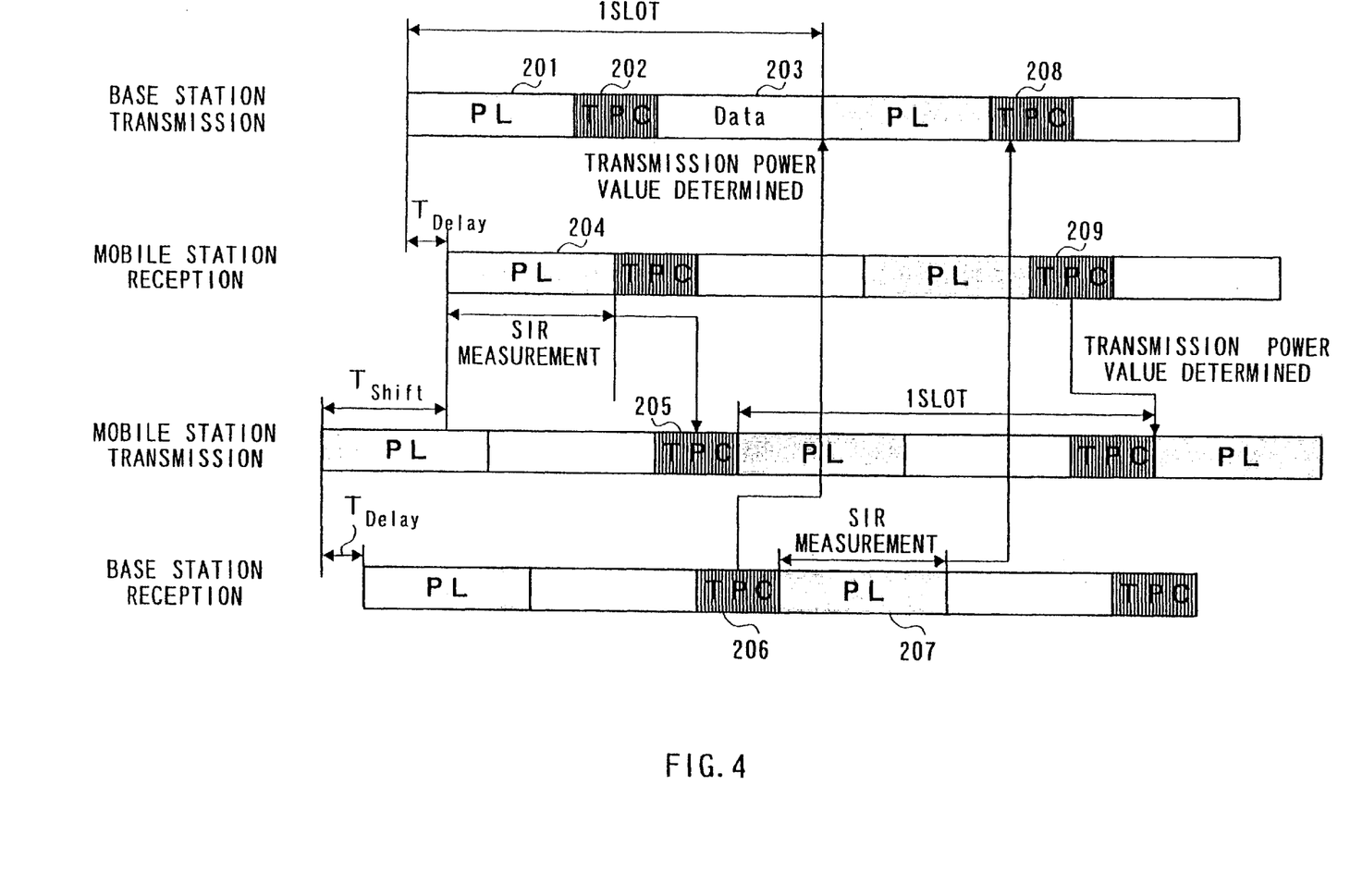
FIG. 4 is a slot configuration diagram of a signal transmitted/received by a base station apparatus and mobile station apparatus according to Embodiment 1 of the present invention.

First, the transmission power control performed on the downlink is explained. A signal sent from the base station (signal made up of pilot data 201, transmission power control data 202 and data 203) is received by the mobile station with a propagation delay of TDelay (corresponding to the distance from the base station to the mobile station).

The mobile station measures reception SIR according to pilot data 204 at the start of a slot. It compares this SIR measurement result with a reference SIR and if the reception SIR is lower, generates a transmission power control bit as a command to instruct the base station to increase transmission power, and if the reception SIR is higher, generates a transmission power control bit as a command to instruct the base station to lower transmission power. This transmission power control bit is embedded as transmission power control data 205 on the uplink and transmitted.

At this time, data locations in the slot are determined by taking account of a delay. More specifically, data are located in such a way that pilot data 204 is separated from transmission power control data 205, that is, some data are inserted between the pilot data and transmission power control data. Furthermore, the slot is shifted by TShift. This allows the transmission power control bit obtained by the SIR measurement to be included in transmission power control data 205 on the uplink without delays. In other words, the transmission power control data on the uplink can be reflected in the slot without delays.

A signal sent from the mobile station is received by the base station with a delay of TDelay. The base station detects transmission power control data 206 and determines the transmission power value on the downlink from the result and reflects it in the transmission power at the start of the next downlink slot.

Then, the operation of transmission power control performed on the uplink is explained. A signal sent from the mobile station is received by the base station with a delay of TDelay. The base-station measures SIR from pilot data 207 at the start of a slot and compares the reception SIR with a reference SIR as in the case of the mobile station, generates a transmission power control bit which is a command to instruct whether to increase or decrease transmission power and embeds it in transmission power control data 208 on the downlink and transmits it.

In this case, the slot sent from the mobile station has a configuration in which the pilot data is separated from the transmission power control data and thus the transmission power control bit based on the SIR measurement result of pilot data 207 can be embedded in transmission power control data 208 of the next slot. Therefore, the transmission power control data on the downlink can be reflected in the slot without delays.

A signal sent from the base station is received by the mobile station with a delay of TDelay. The mobile station detects transmission power control data 209 and determines the transmission power value on the uplink from the result and reflects it in the transmission power at the start of the next uplink slot.

Thus, the radio communication system according to the present embodiment places the pilot data separate from the transmission power control data in a slot for the uplink and provides an appropriate slot offset between the uplink and downlink, which allows the pilot data and transmission power control data locations to be determined adequately. It also allows the slot locational relationship between the uplink and downlink to be arranged adequately, making it possible to minimize control delays in closed-loop transmission power control at various transmission rates and suppress deterioration of the measurement accuracy caused by shortening the time for measuring the quality of the received signal.

With such a configuration, it is possible to adequately determine the pilot data and transmission power control data locations and the slot locational relationship between the uplink and downlink according to processing delays and propagation delays, which ensures that control delays are minimized.

Therefore, the present embodiment is capable of implementing a control delay of closed-loop transmission power control in one time slot for both the uplink and downlink without reducing the SIR measurement time even for low rate transmission.

(Embodiment 2)

Figure 5:
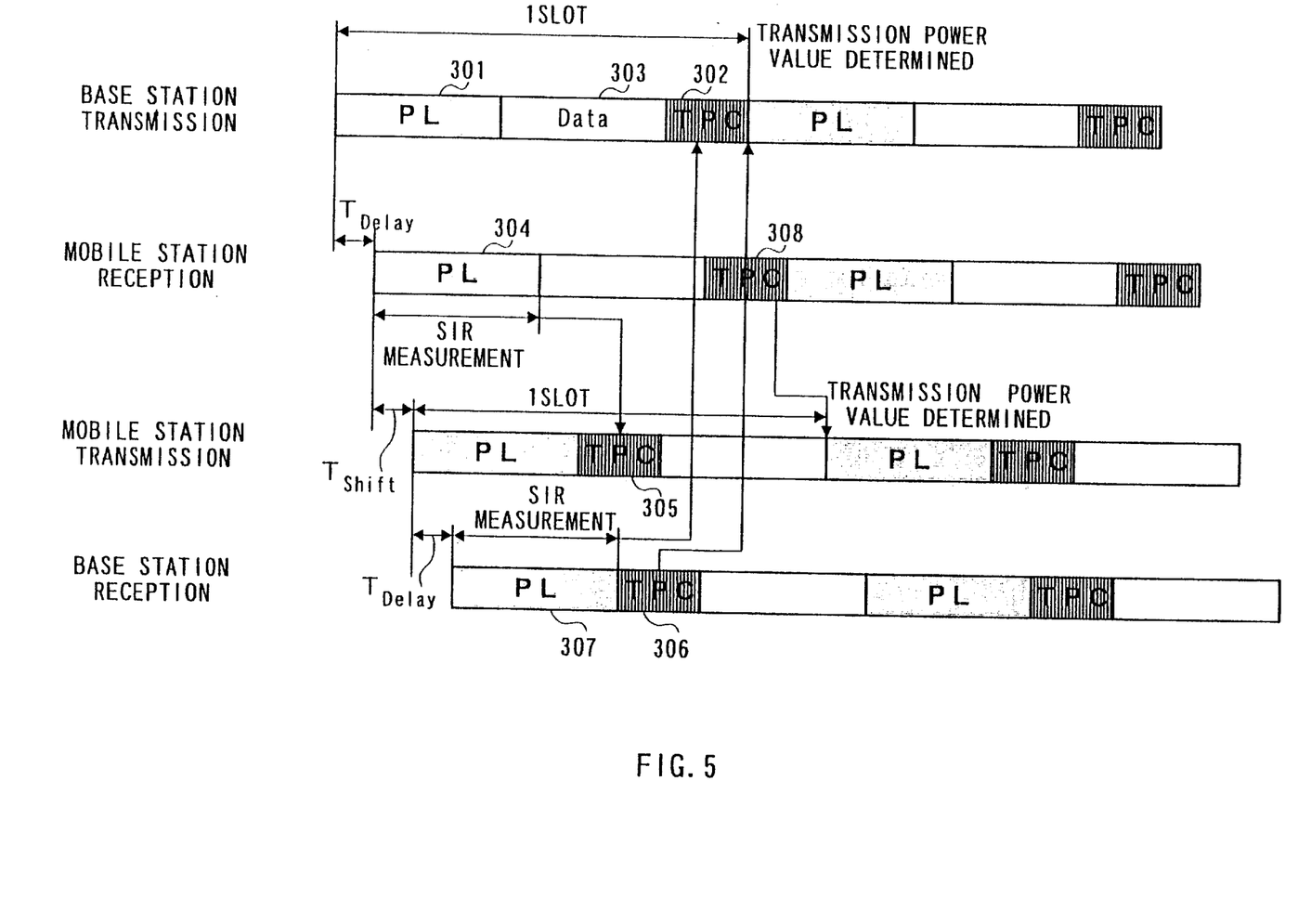
FIG. 5 is a slot configuration diagram of a signal transmitted/received by a base station apparatus and mobile station apparatus according to Embodiment 2 of the present invention.

FIG. 5 is a slot configuration diagram of a signal transmitted/received by a radio communication system according to Embodiment 2 of the present invention. In the present embodiment, the slot configuration for the uplink is the same as the conventional one, but the slot configuration for the downlink is different from that of Embodiment 1 in that the pilot data are separated from the transmission power control data in the slot, and is different from Embodiment 1 in the slot offset between the downlink and uplink. It performs transmission power control in the same way as for Embodiment 1.

That is, the base station determines data locations in the slot by taking delays into account. More specifically, data are located in such a way that pilot data 301 is separated from transmission power control data 302, that is, data 303 are inserted between pilot data 301 and transmission power control data 302.

In this case, the mobile station measures SIR using received pilot data 304 and embeds the result in transmission power control data 305. Furthermore, the slot is shifted by TShift. This allows transmission power control of the next slot to be performed without delays according to the transmission power control value of transmission power control data 308. As a result, the transmission power control data of the uplink can be reflected in the slot without delays.

On the other hand, the base station measures SIR according to pilot data 307 at the start of a slot and generates a transmission power control bit according to the result, embeds it in transmission power control data 302 on the downlink and transmits it. In this case, the slot sent to the mobile station has such a configuration that the pilot data are separated from the transmission power control data, making it possible to embed the transmission power control bit based on the SIR measurement result of pilot data 307 in transmission power control data 302 of the next slot. Therefore, the transmission power control data of the uplink can be reflected in the next slot without delays.

Furthermore, the base station detects transmission power control data 306, determines the transmission power value of the downlink from this result and reflects it in the transmission power at the start of the downlink slot.

As shown above, the radio communication system according to the present embodiment places the pilot data separate from the transmission power control data for the downlink even for low rate transmission and adequately provides a slot offset between the uplink and downlink, making it possible to implement control delays in closed-loop transmission power control with one time slot without reducing the SIR measurement time.

(Embodiment 3)

Figure 6:
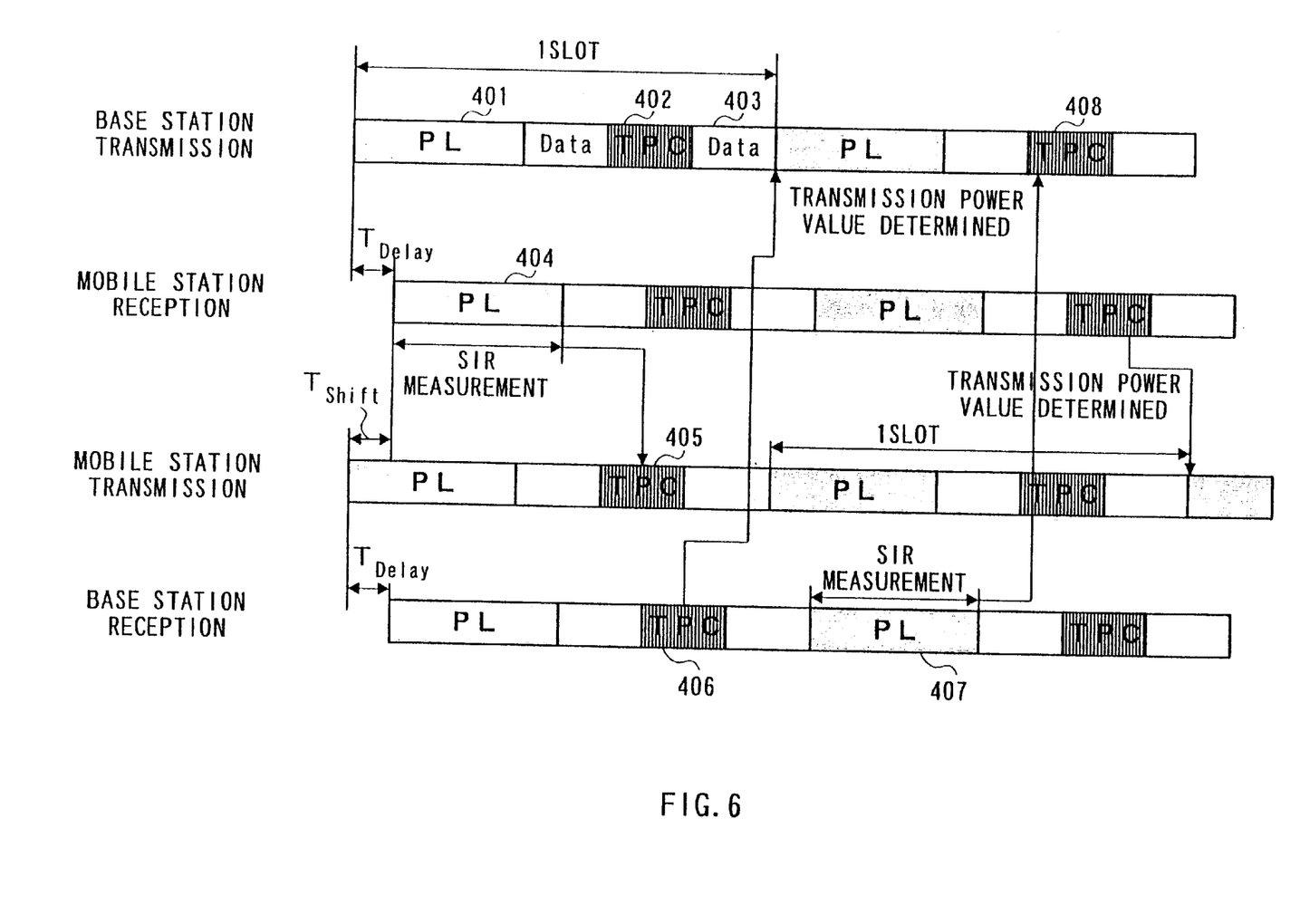
FIG. 6 is a slot configuration diagram of a signal transmitted/received by a base station apparatus and mobile station apparatus according to Embodiment 3 of the present invention.

FIG. 6 is a slot configuration diagram of a signal transmitted/received by a radio communication system according to Embodiment 3 of the present invention. The present embodiment places pilot data separate from the transmission power control data in a slot for both the uplink and downlink and provides an appropriate slot offset between the uplink and downlink. The present embodiment also performs transmission power control using the same method as that in Embodiment 1.

That is, the base station and mobile station determine data locations in the slot by taking delays into account. More specifically, data are located in such a way that pilot data 401 is separated from transmission power control data 402, that is, data 403 is inserted between pilot data 401 and transmission power control data 402.

In this case, the mobile station measures SIR using received pilot data 404 and embeds the result in transmission power control data 405. Furthermore, the slot is shifted by TShift. This allows transmission power control of the next slot to be performed without delays according to the transmission power control value of transmission power control data 406. As a result, the transmission power control data of the uplink can be reflected in the slot without delays.

The base station measures SIR according to pilot data 407 at the start of a slot and generates a transmission power control bit according to the result, embeds it in transmission power control data 408 on the downlink and transmits it. In this case, the slot sent to the mobile station has such a configuration that the pilot data are separate from the transmission power control data, making it possible to reflect the transmission power control bit of transmission power control data 409 based on the SIR measurement result of pilot data 407 in the start of the next uplink slot.

As shown above, the radio communication system according to the present embodiment places the pilot data separate from the transmission power control data for the downlink even for low rate transmission and adequately provides a slot offset between the uplink and downlink, making it possible to implement control delays in closed-loop transmission power control with one time slot without reducing the SIR measurement time for both the uplink and downlink.

(Embodiment 4)

Figure 7:
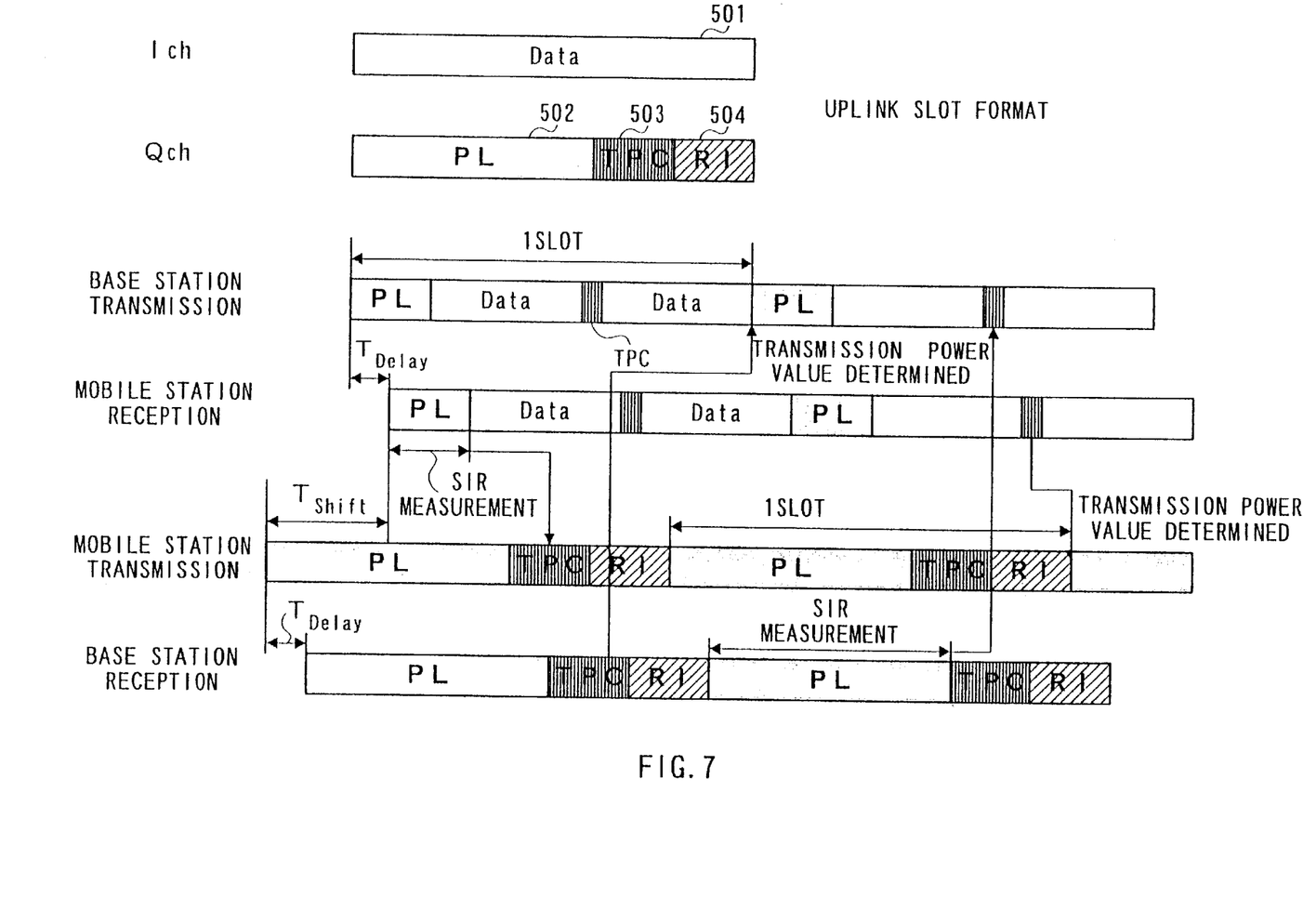
FIG. 7 is a slot configuration diagram of a signal transmitted/received by a base station apparatus and mobile station apparatus according to Embodiment 4 of the present invention.

FIG. 7 is a slot configuration diagram of a signal transmitted/received in a radio communication system according to Embodiment 4 of the present invention. In this slot configuration, data 501 is assigned to Ich on the uplink, and control information such as pilot data 502, transmission power control data 503 and rate information 504 is assigned to Qch. In this case, since the control information is only placed on Qch, the percentage of the pilot data is greater no matter what the transmission rate may be. As in the case of Embodiment 2, the present embodiment also places the pilot data separate from the transmission power control data of the uplink, provides an appropriate slot offset between the uplink and downlink and performs transmission power control through operations similar to those in Embodiment 1.

Thus, the transmission/reception apparatus according to the present embodiment can, by placing the pilot data separate from the transmission power control data and providing an appropriate slot offset between the uplink and downlink, minimize control delays in closed-loop transmission power control for both the uplink and downlink without reducing the SIR measurement time.

(Embodiment 5)

Figure 8:
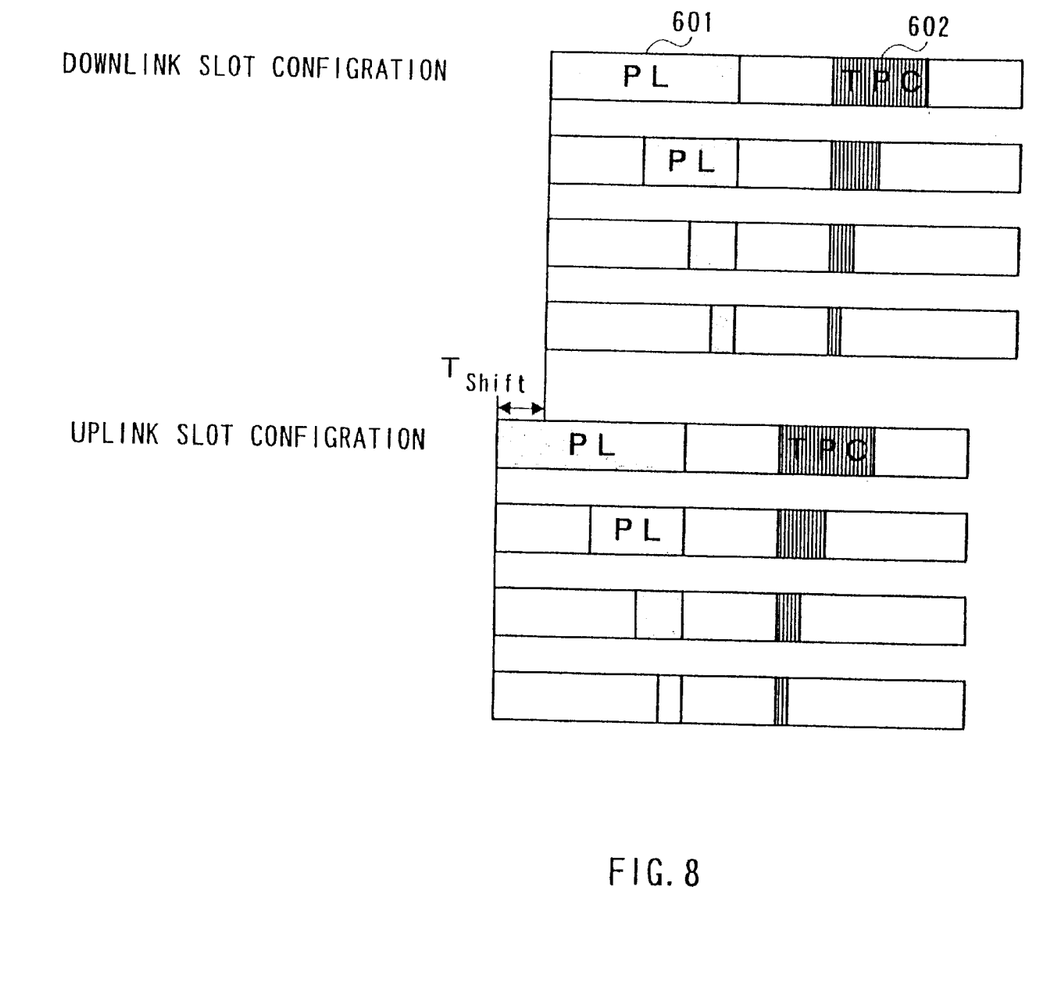
FIG. 8 is a slot configuration diagram of a signal transmitted/received by a base station apparatus and mobile station apparatus according to Embodiment 5 of the present invention.

FIG. 8 is a slot configuration diagram of a signal transmitted/received by a radio communication system according to Embodiment 5 of the present invention. In multi-rate transmissions, the absolute times of pilot data 601 and transmission power control data 602 vary depending on the rate of the slot configuration. Therefore, the ratios of the pilot data and transmission power control data to the slot each vary depending on the transmission rate.

In this case, slots with other transmission rates are formed with their pilot data and transmission power control data locations matched with those of the slot configuration with the lowest possible transmission rate. That is, as shown in FIG. 8, slots are configured in such a way that the distance (data length) between pilot data 601 and the transmission power control data is kept constant for different transmission rates. At this time, it is possible to perform transmission power control in the same way as for the embodiment above by carrying out the same processing as that in the above embodiment for all possible transmission rates.

Thus, the transmission/reception apparatus according to the present embodiment can, for different transmission rates, minimize control delays in closed-loop transmission power control for both the uplink and downlink while keeping the slot offset between the uplink and downlink constant, without reducing the SIR measurement time. It also eliminates the necessity of changing a slot offset between the uplink and downlink for communications with different transmission rates, eliminating the necessity of complicated processing by changing transmission rates.

The present embodiment takes as an example the case where slots are configured in such a way that the distance (data length) between pilot data 601 and the transmission power control data is kept constant for different transmission rates. However, the effects of the present embodiment will be further enhanced if data locations are determined in such a way that other pilot data and transmission power control data locations are shifted so as to fit within the pilot data length and transmission power control data length corresponding to the lowest transmission rate.

Figure 9:
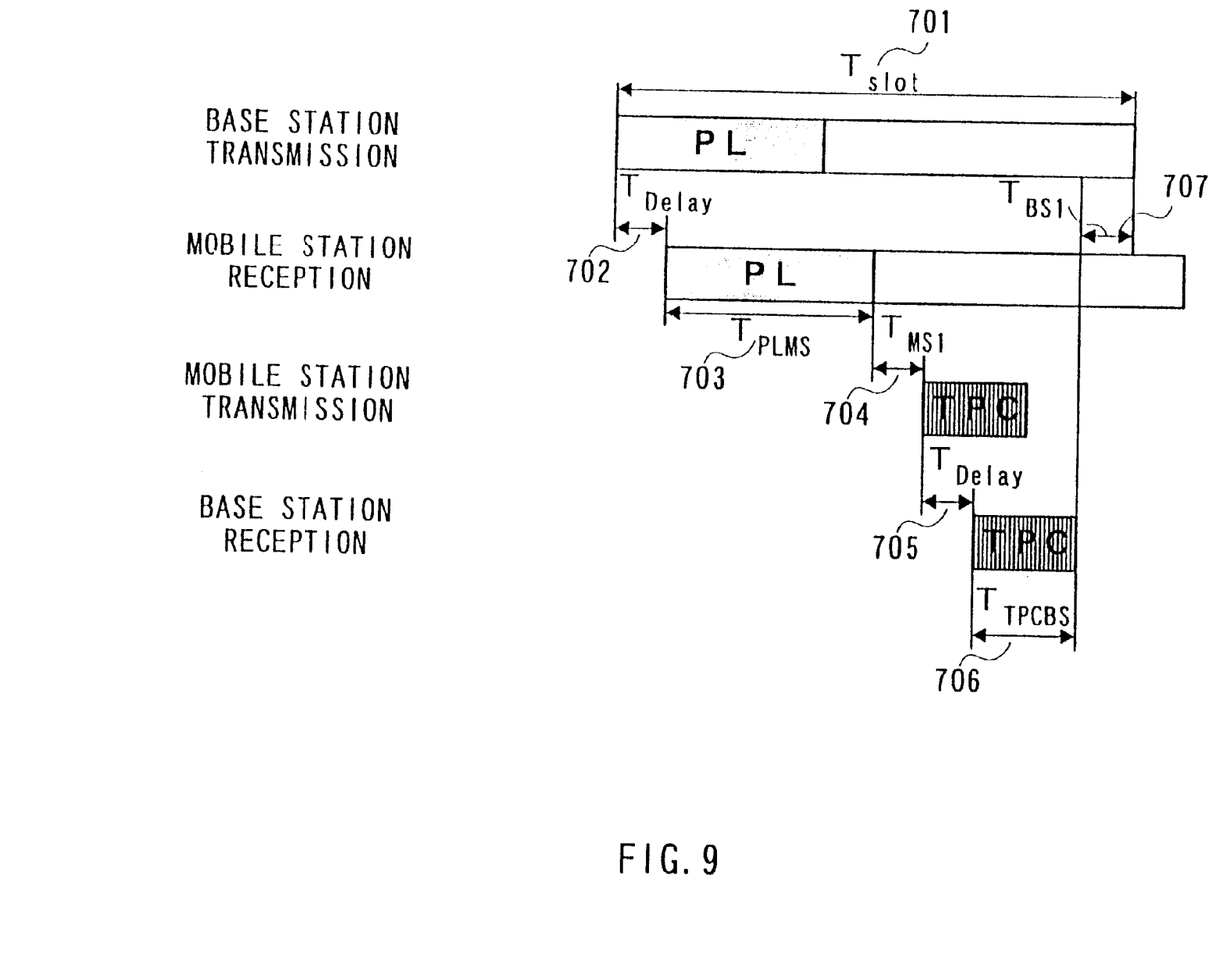
FIG. 9 is a schematic showing the time necessary for transmission power control processing on the downlink according to the embodiments of the present invention.

Here, the data locations of pilot data and transmission power control data with the slot configurations in Embodiments 1 to 5 above are explained. FIG. 9 shows the time required for processing transmission power control on the downlink.

In FIG. 9, supposing that the propagation delay from the base station to the mobile station is TDelay 702; the pilot data length to measure SIR is TPLMS 703; the processing time after the mobile station has received the last part of the pilot data until it measures SIR and embeds the transmission power control data is TMS1 704; the propagation delay from the mobile station to the base station is TDelay 705; the transmission power control data length is TTPCBS 706; and the processing time after the base station has received the transmission power control data until it detects the transmission power control data and changes the power is TBS1 707, the possible control delay time can be expressed in the following expression.

Transmission power control delay time (downlink) =TDelay+ TPLMS+TMS1+TDelay+TTPCBS+TBS1

Figure 10:
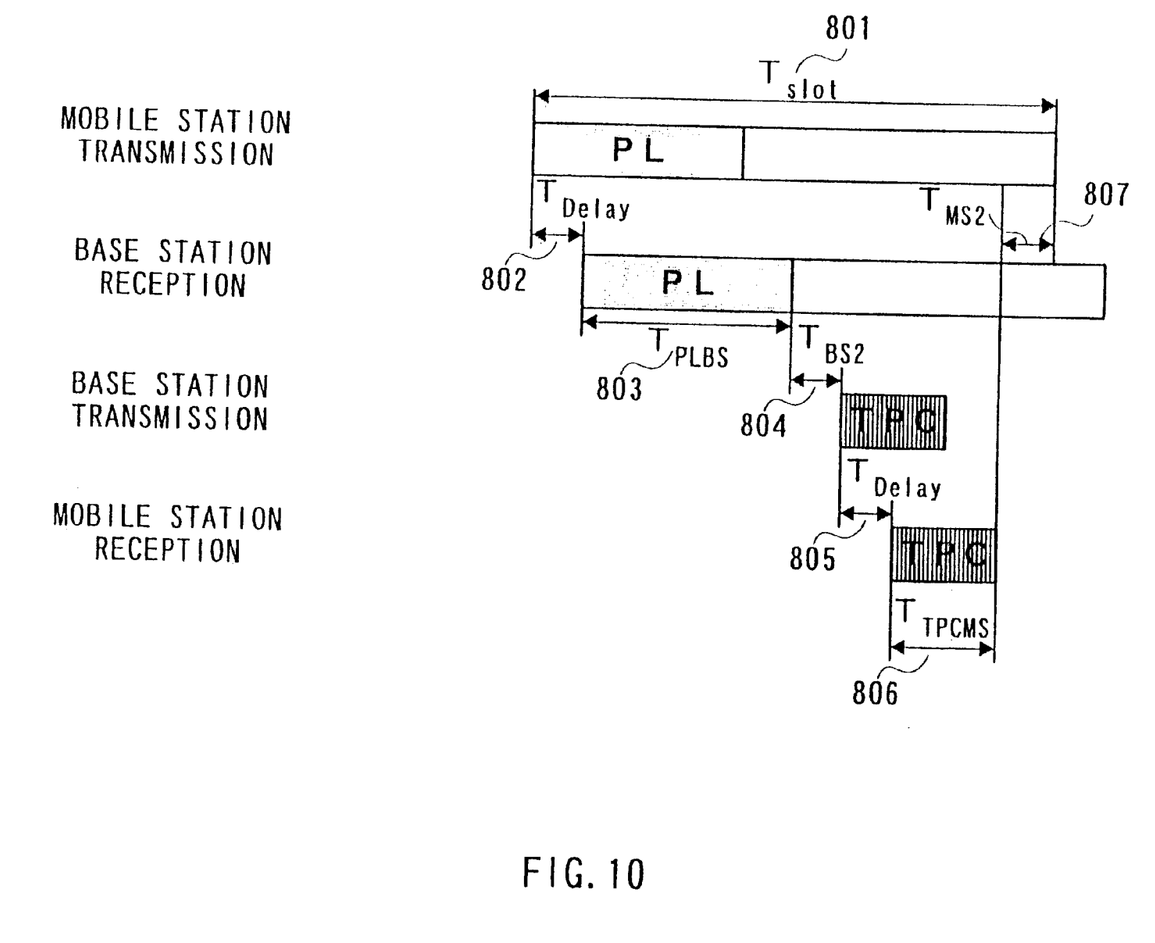
FIG. 10 is a schematic showing the time necessary for transmission power control processing on the uplink according to the embodiments of the present invention.

Furthermore, FIG. 10 shows the processing time required for transmission power control processing on the uplink. In FIG. 10, supposing that the propagation delay from the mobile station to the base station is TDelay 802; the pilot data length to measure SIR is TPLBS 803; the processing time after the base station has received the last part of the pilot data until it measures SIR and embeds the transmission power control data is TBS2 804; the propagation delay from the base station to the mobile station is TDelay 805; the transmission power control data length is TTPCMS 806; and the processing time after the mobile station has received the transmission power control data until it detects the transmission power control data and changes the power is TMS2 807, the possible control delay time can be expressed in the following expression.

Transmission power control delay time (uplink) =TDelay+ TPLBS+TBS2+TDelay+TTPCMS+TMS2

Where, the pilot data length is the data length to measure SIR, and if SIR is also measured using data other than the pilot data this value includes that length.

Therefore, data locations with the slot configurations in Embodiments 1 to 5 are performed by taking account of these processing times. Thus, the possible locations of the pilot data and transmission power control data and a slot offset between the uplink and downlink are determined from the above expression.

As shown above, the slot configuration method in the present embodiment allows the optimal slot configuration to be assigned with a minimum control delay in closed-loop transmission power control.

Embodiments 1 to 5 above are explained by taking as an example the case where SIR is used as the quality of the received signal, but the present invention can also be implemented in the same way using other parameters as the quality of the received signal.

As explained above, the base station apparatus and transmission power control method of the present invention places pilot data and transmission power control data independently of each other in a transmission/reception apparatus which carries out closed-loop type transmission power control and places slots by providing an offset in the slot locational relationship between the uplink and downlink, making it possible to minimize control delays in closed-loop transmission power control at various transmission rates and suppress deterioration in the measurement accuracy caused by reducing the SIR measurement time.

The present invention is not limited to the above described embodiments, and various variations and modifications may be possible without departing from the scope of the present invention.

This application is based on the Japanese Patent Application No.HEI10-126225 filed on May 8, 1998, entire content of which is expressly incorporated by reference herein.

What is claimed is:

1. A base station apparatus, comprising:

a data location determining circuit for determining locations in a slot of (a) transmission power control data to be transmitted based on measured quality of received pilot data and (b) pilot data to be transmitted with power-controlled by a received transmission power control data, by taking into account processing delays required for transmission power control and propagation delays; and a slot offset setting circuit for providing an offset for a slot locational relationship between uplink and downlink by taking into account the processing delays and the propagation delays, wherein one time slot control delay is provided in a case where a combination of length of the received pilot data, a length of the received transmission power control data, the processing delays and the propagation delays is not greater than a length of one slot.

2. The base station apparatus according to claim 1, wherein the data location determining circuit determines the locations in such a way that the pilot data to be transmitted and the transmission power control data to be transmitted are placed close to each other in the slot.

3. The base station apparatus, according to claim 1, wherein the data used for the uplink includes data obtained by multiplexing the data of a first channel to which only data are assigned and other data of a second channel to which at least pilot data and transmission power control data are assigned.

4. A base station apparatus, comprising:

a data location determining circuit for determining locations in a slot of (a) transmission power control data to be transmitted based on measured quality of received pilot data and (b) pilot data to be transmitted with power-controlled by a received transmission power control data, by taking into account processing delays required for transmission power control and propagation delays; and a slot offset setting circuit for providing an offset for a slot locational relationship between uplink and downlink by taking into account the processing delays and the propagation delays, where the data location determining circuit determines the data locations such that during multi-rate transmission, the data locations of pilot data and transmission power control data with other transmission rates than the lowest transmission rate are determined so as to fit within locations corresponding to a pilot data and a transmission power control data with the lowest transmission rate, and wherein one time slot control delay is provided in a case where a combination of length of the received pilot data, a length of the received transmission power control data, the processing delays and the propagation delays is not greater than a length of one slot.

5. A mobile station apparatus which performs radio communications with a base station apparatus, wherein said base station apparatus comprises:

a data location determining circuit for determining locations in a slot of (a) transmission power control data to be transmitted based on measured quality of received pilot data and (b) pilot data to be transmitted with power-controlled by a received transmission power control data, by taking into account processing delays required for transmission power control and propagation delays; and a slot offset setting circuit for providing an offset for a slot locational relationship between uplink and downlink by taking into account the processing delays and the propagation delays, wherein one time slot control delay is provided in a case where a combination of length of the received pilot data, a length of the received transmission power control data, the processing delays and the propagation delays is not greater than a length of one slot.

6. A radio communication system which performs radio communications between a mobile station apparatus and a base station apparatus, wherein said base station apparatus comprises:

a data location determining circuit for determining locations in a slot of (a) transmission power control data to be transmitted based on measured quality of received pilot data and (b) pilot data to be transmitted with power-controlled by a received transmission power control data, by taking into account processing delays required for transmission power control and propagation delays; and a slot offset setting circuit for providing an offset for a slot locational relationship between uplink and downlink by taking into account the processing delays and the propagation delays, wherein one time slot control delay is provided in a case where a combination of length of the received pilot data, a length of the received transmission power control data, the processing delays and the propagation delays is not greater than a length of one slot.

7. A data configuration method, comprising:

determining locations in a slot of (a) transmission power control data to be transmitted based on measured quality of received pilot data and (b) pilot data to be transmitted with power-controlled by a received transmission power control data by taking into account processing delays required for transmission power control and propagation delays; and providing an offset for a slot locational relationship between uplink and downlink by taking into account the processing delays and the propagation delays;

wherein one time slot control delay is provided in a case where a combination of length of the received pilot data, a length of the received transmission power control data, the processing delays and the propagation delays is not greater than a length of one slot.

8. A transmission power control method, comprising:

measuring a quality of pilot data of a received signal;

controlling transmission power based on transmission power control data of the received signal;

determining locations in a slot of (a) power control data to be transmitted based on measured quality of received pilot data and (b) pilot data to be transmitted with power-controlled by a received transmission power control data by taking into account processing delays required for transmission power control and propagation delays; and providing an offset for a slot locational relationship between uplink and downlink by taking into account the processing delays and the propagation delays;

wherein one time slot control delay is provided in a case where a combination of length of the received pilot data, a length of the received transmission power control data, the processing delays and the propagation delays is not greater than a length of one slot.

9. The transmission power control method according to claim 8, wherein the data used for the uplink comprises data obtained by multiplexing the data of a first channel to which only data are assigned and other data of a second channel to which at least pilot data and transmission power control data are assigned.

10. A transmission power control method, comprising:

measuring a quality of pilot data of a received signal;

controlling transmission power based on transmission power control data of the received signal;

determining locations in a slot of (a) power control data to be transmitted based on measured quality of received pilot data and (b) pilot data to be transmitted with power-controlled by a received transmission power control data by taking into account processing delays required for transmission power control and propagation delays; and providing an offset for a slot locational relationship between uplink and downlink, wherein during multi-rate transmission, the data locations of pilot data and transmission power control data with other transmission rates other than the lowest transmission rate are determined so as to fit within locations corresponding to a pilot data and a transmission power control data with the lowest transmission rate, and wherein one time slot control delay is provided in a case where a combination of length of the received pilot data, a length of the received transmission power control data, the processing delays and the propagation delays is not greater than a length of one slot.

11. A transmission power control method in a CDMA communication system, said method comprising:

(a) providing information concerning processing delays required for transmission power control and propagation delays in said CDMA system; and (b) determining location in a slot of (a) power control data to be transmitted based on measured quality of received pilot data and (b) pilot data to be transmitted with power-controlled by a received transmission power control data by taking into account the processing delays required for transmission power control and the propagation delays, wherein one time slot control delay is provided in a case where a combination of length of the received pilot data, a length of the received transmission power control data, the processing delays and the propagation delays is not greater than a length of one slot.

12. The transmission power control method according to claim 11, wherein step (b) comprises determining locations involving arranging said pilot data and said power control data with some data inserted therebetween in the slot, to achieve the one time slot control delay.

13. The transmission power control method according to claim 11, wherein said method is used in a radio communication base station apparatus, which performs the one time slot control delay.

14. A radio communication method in a communication system in which a radio communication is performed between a base station apparatus and a mobile station apparatus, said system for having an uplink channel comprised of an I channel and a Q channel, and providing a first slot configuration in which control information containing pilot data and transmission power control data are assigned for said Q channel, while providing a second slot configuration in which pilot data and transmission power control data are arranged with some data, other than pilot data and transmission power control data, inserted therebetween on a downlink channel, said method comprising:

(a) providing information concerning processing delays required for transmission power control and propagation delays in said system;

(b) determining locations in a slot of (a) power control data to be transmitted based on measured quality of received pilot data and (b) pilot data to be transmitted with power-controlled by a received transmission power control data by taking into account the processing delays required for transmission power control and the propagation delays; and (c) performing a communication using the first and second slot configurations with data locations determined in accordance with stop (b), wherein one time slot control delay is provided in a case where a combination of length of the received pilot data, a length of the received transmission power control data, the processing delays and the propagation delays is not greater than a length of one slot.

15. A transmission power control method in a communication system in which a radio communication is performed between a base station apparatus and a mobile station apparatus, said system for having an uplink channel comprised of an I channel and a Q channel, and providing a first slot configuration in which control information containing pilot data and transmission power control data are assigned for said Q channel, while providing a second slot configuration in which the pilot data and the transmission power control data are arranged with some data, other than pilot data and transmission power control data, inserted therebetween on a downlink channel, said method comprising:

(a) providing information concerning processing delays required for transmission power control and propagation delays in the system;

(b) determining locations in a slot of (a) power control data to be transmitted based on measured quality of received pilot data and (b) pilot data to be transmitted with power-controlled by a received transmission power control data by taking into account the processing delays required for transmission power control and the propagation delays; and (c) performing one time slot control delay in a case where a combination of length of the received pilot data, a length of the received transmission power control data, the processing delays and the propagation delays is not greater than a length of one slot.

* * * * *